Figure 1:
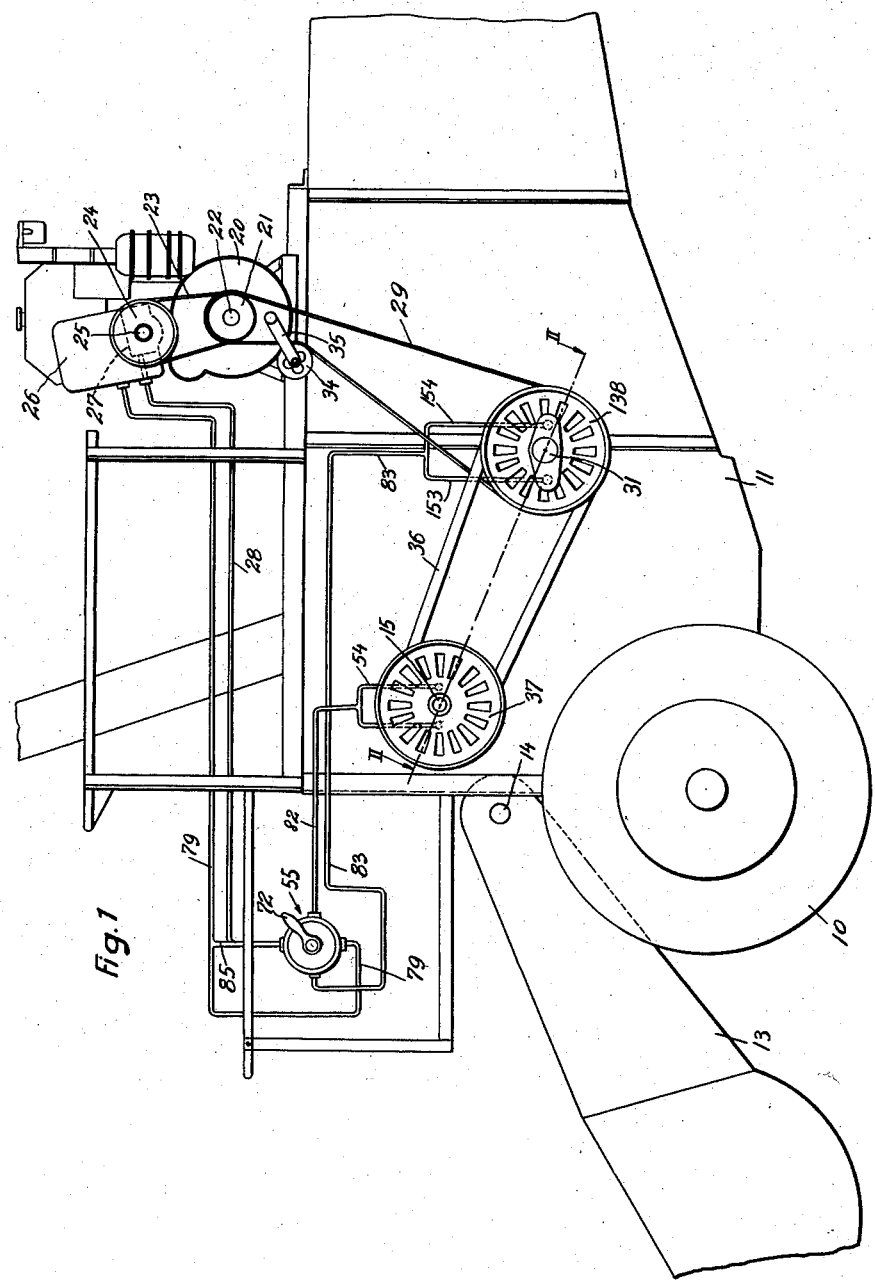

May 26, 1959

A. CLAAS 2,887,892

THRESHING MACHINE

Filed Nov. 22, 1955

3 Sheets-Sheet 1

Inventor
August Claas
BY
Richardy Geier
ATTORNEYS

May 26, 1959  A. CLAAS  2,887,892
THRESHING MACHINE
Filed Nov. 22, 1955  3 Sheets-Sheet 3

Inventor
August Claas
BY
Richards Geier
ATTORNEYS

2,887,892

THRESHING MACHINE

August Claas, Harsewinkel, Westphalia, Germany

Application November 22, 1955, Serial No. 548,462

Claims priority, application Germany December 6, 1954

2 Claims. (Cl. 74—230.17)

My invention relates to a threshing machine and, more particularly, to improved means for variably determining the speed of operation of the threshing machine.

It is the object of the present invention to provide a threshing machine capable of operating with superior efficiency under widely differing conditions and of threshing moist material and dry material equally well. It is a more specific object of my invention to provide a threshing machine in which the speed of the threshing drum may be varied by simple manual adjustment of a valve during the operation of the threshing machine, i.e. without requiring stoppage of the machine for such change of speed of the threshing drum.

Figure 2:
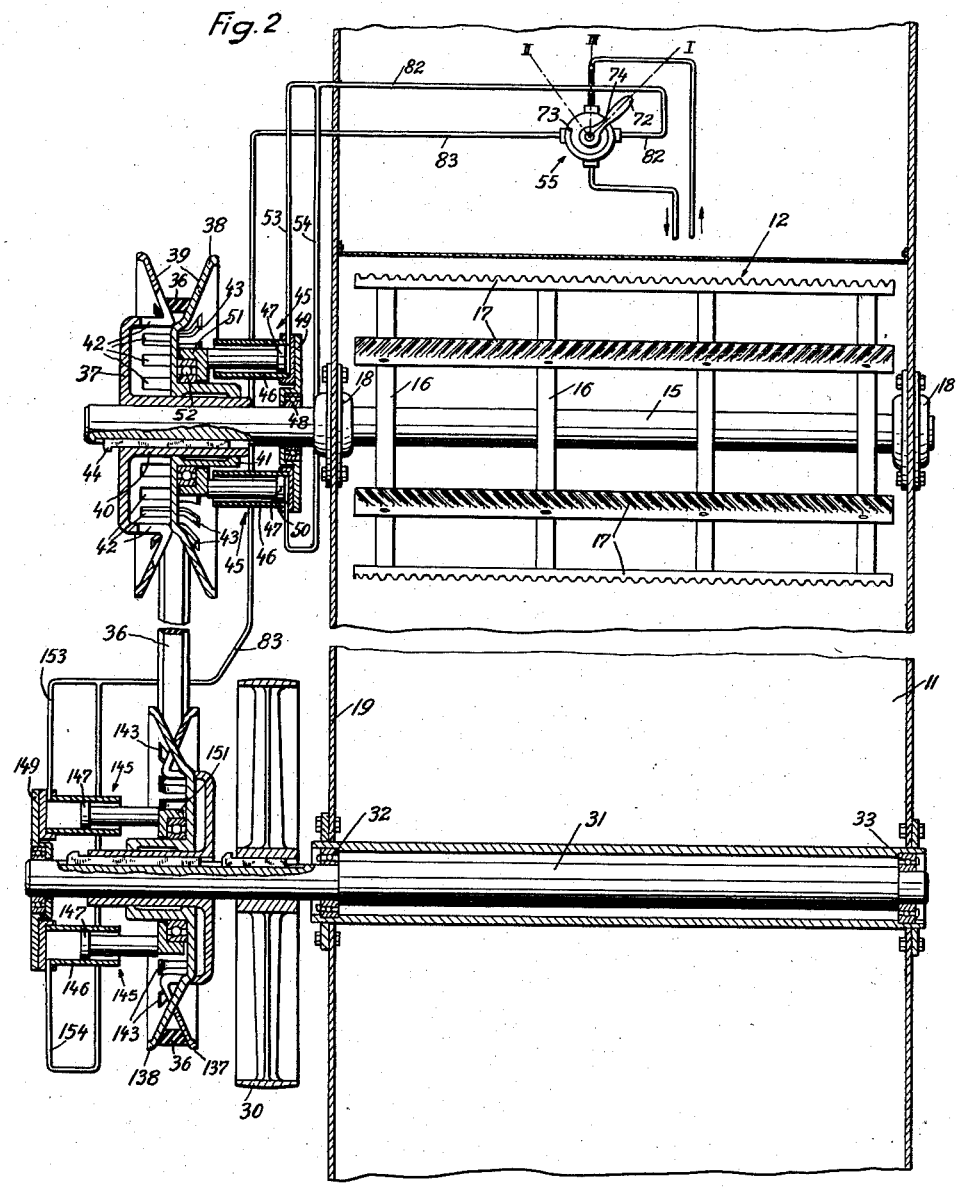
Figure 3:
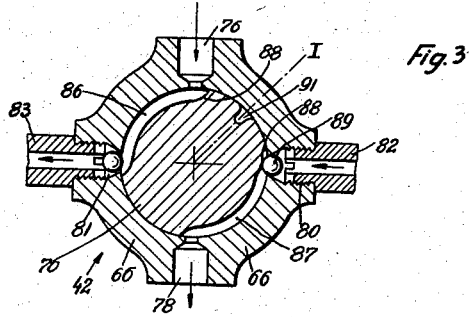
Figure 4:
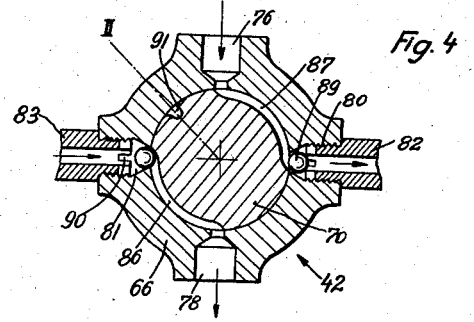
Figure 5:
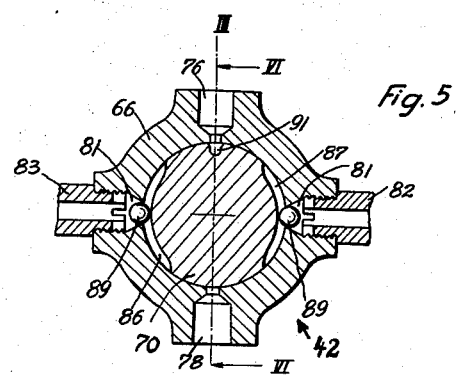
Figure 6:
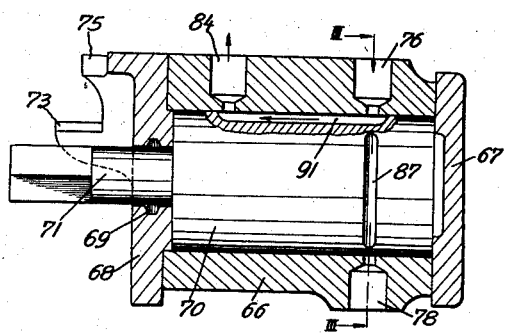

Further objects of my invention will appear from the detailed description following hereinafter of a preferred embodiment of my invention, and the features of novelty will be pointed out in the claims, it being understood that such detailed description serves the purpose of illustrating the invention rather than that of restricting or limiting the same. In the drawings:

Fig. 1 shows a partial elevation of a harvester thresher provided with the improved means for determining the speed of the threshing drum, Fig. 2 is the section taken along the line II—II of Fig. 1 on an enlarged scale, Fig. 3 is a transverse section taken through the valve shown in Fig. 2, the valve being in position for reducing the ratio of transmission, the section being taken along the line III—III of Fig. 6, Fig. 4 is a sectional view of the valve similar to that of Fig. 3 showing the valve in position for increasing the ratio of transmission, Fig. 5 is a sectional view of the valve similar to that of Fig. 3 showing the valve in position for maintaining the ratio of transmission set up, and Fig. 6 is an axial section taken through the control valve, the section being taken along the line VI—VI of Fig. 5.

The harvester thresher shown in Fig. 1 comprises a chassis supported by wheels 10 and carrying a housing 11 encasing a threshing drum 12. A header platform 13 pivotally connected to the housing 11 at 14 serves to carry the conventional sickel bar and a conveyor (not shown) which feeds the grain straw into the housing 11 to the threshing drum 12 constituted by the conventional rasp bar cylinder composed of a shaft 15, spiders 16 fixed thereto and rasp bars 17 carried thereby. The shaft 15 is journalled in bearings 18 supported by the side walls of housing 11 and projects through the side wall 19 of the housing outwardly thereof.

An electric motor 20 is mounted on top of the housing and drives a pulley 21 fixed to its shaft 22. The pulley 21 is connected by a belt 23 with a pulley 24 mounted on a shaft 25 journalled in a housing 26. This housing encases a pump 27 having an outlet communicating with a pressure pipe 28 and having an inlet communicating with the sump at the bottom of housing 26. A second pulley fixed to shaft 22 is connected by a belt 29 with a pulley 30 fixed to the outer end of a driving shaft 31 journalled by means of anti-friction bearings 32, 33 in the side walls of housing 11. An idle pulley 34 carried by a spring-biased arm 35 serves to keep the belt 29 taut. The shaft 31 and the threshing drum 12 are connected by a variable V-belt transmission, and fluid-operable means are provided for adjusting such transmission to variably determine the ratio of transmission thereof without necessitating a stoppage of the threshing drum for such purpose.

The variable V-belt transmission and the fluid-operable means for adjusting the same form subject matter of my copending application relating to a Variable Speed Transmission and Variable Pitch Pulley Therefore, Serial No. 548,463.

It will be briefly described hereinafter with reference to Fig. 2. Broadly speaking, the transmission comprises a pair of variable pitch pulleys, one mounted on shaft 15 and the other one on shaft 31, both cooperating with a V-belt 36. The variable pitch pulley on shaft 15 comprises a stationary conical disk 37 (which is stationary in that it cannot be shifted lengthwise of shaft 15 although rotating together therewith) and a slidable conical disk 38. Each disk is provided with a conical face 39, and the disks are so mounted on the supporting shaft 15 that the faces 39 are in opposed relationship. Each disk comprises a plane annular plate adjoining the hub portion 40, or 41 respectively, and a cylindrical section which connects the periphery of the plane annular plate with the inner periphery of the conical section. For the purpose of permitting the disks 37 and 38 to be moved to relative positions in which their profiles intersect, the stationary disk 37 is provided with radial slots 42 extending through the inner zone of the conical section and through the cylindrical section thereof. Similarly, the slidable disk 38 is provided with slots 43 likewise extending through the inner zone and the cylindrical section thereof. The slots 42 register with the lands laterally confined by the slots 43.

The hub portion 40 is fixed to the shaft 15 for instance by a key 44, whereas the hub 41 of the disk 38 is slidable on the hub portion 40 and secured against relative rotation thereto by suitable splines not shown.

Thus, it will appear that the disks 37 and 38 are mounted on the supporting shaft 15 for common rotation and relative axial displacement. The displacement changes the spacing of the conical faces 39 and the consequent position of the V-belt 36 which engages the conical faces 39.

A pair of fluid-operable units 45 is provided for effecting such displacement. Each unit is composed of a cylinder element 46 and of a piston element 47. The axes of the units 45 extend in the direction of the axial displacement of the disk 38. Moreover, means including anti-friction bearings are provided for connecting one of the elements 46, 47 in non-rotating condition with one disk and for connecting the other one of the elements 46, 47 in non-rotating condition with the other disk. In the embodiment shown in Fig. 2, the cylinder elements 46 are connected with the stationary disk 37 and the piston elements 47 are connected with the slidable disk 38. For this purpose, the shaft 15 is provided with a ball bearing 48 having its inner race secured against axial displacement on shaft 15, the outer race carrying a plate 49 to which cup-shaped cylinder heads 50 are suitably secured, the cylinders 46 engaging internal threads of such cylinder heads. The pistons 47 are integral with piston rods which extend out of the cylinders 46 and engage an annular member 51. The hub 41 carries the inner race of an anti-friction bearing 52, the outer race of which supports the annular member 51. The cylinder heads 50 have ports for admission and discharge of a fluid under pressure, such ports communicating with conduits 53 and 54.

The variable pitch pulley mounted on shaft 31 is of the same general design as that on shaft 15, but is reversed with respect thereto in that the two actuating units 145 are disposed at the left. In order to facilitate an understanding of the structure of the lower variable pitch pulley, the reference numerals applied thereto are similar to those applied to the upper pitch pulley differing therefrom by the addition of 100.

A control valve 55 is mounted for convenient manipulation by the driver seated on the driver's seat of the harvester thresher. This valve 55 comprises a cylindrical housing 66 closed by end plates 67 and 68, the latter having a central bore and a sealing ring 69 therein. The valve further comprises a valve member 70 which is rotatably mounted in the valve housing 66 and has a stem 71 extending through the cover plate 68 and being provided with a handle 72 for manipulation. The cover plate 68 has a flange providing end stops 73 and 74 for cooperation with the handle 72. When the handle 72 engages one or the other of these stops is will be in the position I, or II respectively, indicated in Fig. 2. Resilient detent means are provided to arrest the handle in the central position III, for instance in form of a recess 75 provided in the flange of plate 68, such recess being adapted to receive handle 72, the handle being sufficiently resilient to permit the operator to lift it out of the recess 75 when desired.

The housing 66 is provided with an inlet port 76 for the admission of a fluid under pressure supplied from pump 27 through pipe 28, and with an outlet port 78 for the discharge of fluid through a return pipe 79 (Fig. 1) leading back to the housing 26 and to the sump therein. Moreover, the valve housing 66 is provided with a pair of opposite control ports 80 and 81, one of which is connected by a pipe 82 with the ducts 53 and 54 and the other one is connected by a pipe 83 with the ducts 153 and 154.

The four ports 76, 78, 80 and 81 are disposed in a common plane III—III and are spaced 90° apart from one another. The control ports 80 and 81 are disposed in diametrically opposite relationship and the ports 76 and 78 are likewise disposed in diametrically opposite relationship. The housing 66 is provided with a second discharge port 84 connected by a pipe 85 with the discharge pipe 79.

The cylindrical valve member 70 is provided with a pair of opposite grooves 86, and 87 respectively, extending in the plane III—III and embracing an angle of about 90°, end faces 88 of the grooves extending at an acute angle to the radius of the valve member thereat. Each control port 80 or 81 is tapering inwardly and accommodates a spherical valve member 89 constituting a check valve. This valve member is so dimensioned that it may protrude out of the port into the associated groove 86, or 87 respectively, at the same time engaging the conical wall of the port in a sealing fashion, this position being shown in Fig. 4 at the left thereof, or, alternatively, may assume the position shown in Fig. 3 at the left thereof in which it engages the end of pipe 83 provided with slots 90.

Moreover, the valve member 70 is provided with an axially extending groove 91 having one of its ends extending through the plane III—III between the grooves 86 and 87 and spaced therefrom, and having its other end extending through the transverse plane in which port 84 is located.

The operation is as follows:

When the handle 72 is adjusted to the position III, the check valves 89 assume the position shown in Fig. 5 and thus seal the ducts 82, 53, 54 and 83, 153, 154 extending to the actuating units 45, 145. Consequently, the slidable disks 38 and 138 are locked against axial displacement. When the operator wishes to reduce the ratio of transmission from the driving shaft 31 to the threshing drum 12, he must move handle 72 to the position I shown in Fig. 3 thereby admitting fluid under pressure from the pump via pipe 28, port 76, groove 86, check valve 89, slots 90, pipe 83, and pipes 153, 154 to the actuating units 145. The fluid under pressure tends to move pistons 147 of units 145 outwardly to thereby shift slidable disk 138 to the right thus tending to reduce the width of the variable pitch pulley on shaft 31 increasing the effective diameter thereof. The pump is provided with a relief valve keeping the pressure produced within such limts that the pressure exerted by the actuating units 145 will maintain the V-belt 36 under the required tension.

The end face 88 of groove 87 engages the check valve member 89 in port 80 slightly lifting the same from the conical walls of the port and thereby permitting the fluid under pressure entrapped in the units 45 to escape via pipes 53, 54 and 82, port 80, groove 87, port 78, and pipe 79. Therefore, the thrust exerted by the V-belt 36 upon the slidable disk 38 on shaft 15 will move the slidable disk and the pistons 47 connected thereto for common displacement to the right, whereby the effective diameter of the variable pitch pulley on shaft 15 is reduced. When the ratio of transmission has been increased to the desired degree, the operator will turn handle 72 to the position III, thereby permitting both check valves 89 to close, as shown in Fig. 5. Moreover, groove 91 will now establish a communication between the ports 76 and 84 thus connecting the pressure pipe 28 with the discharge pipe 79 whereby the pump is relieved from pressure.

When the operator wishes to increase the ratio of transmission from shaft 31 to shaft 15, he will turn handle 72 to the position II shown in Fig. 4 thereby moving the valve member 70 to the position shown in Fig. 4 in which the communication between ports 76 and 84 is interrupted permitting the pump to build up pressure in port 76 wherefrom the fluid under pressure will flow through groove 87, port 80 and pipes 82, 53 and 54 to the actuating units 45. These actuating units will move slidable disk 38 to the left thus increasing the effective diameter of the variable pitch pulley on shift 15. At the same time the check valve in port 81 will be lifted from its seat by engagement with the end wall of groove 86 permitting the liquid under pressure to escape from the actuating units 145 through pipes 153, 154 and 83, port 81, groove 86, port 78 and discharge pipe 79. Therefore, the thrust exerted by the V-belt 36 on the slidable disk 138 on shaft 31 will permit such slidable disk to move to the left, whereby the effective diameter of the pulley on shaft 31 is reduced.

Hence, it will appear that the control valve constitutes a settable means common to both of the fluid-operable units, such as 45 and 145, for simultaneously admitting a fluid under pressure to one of these units and discharging fluid from the other one of the units, and vice versa.

The effectiveness of the harvester thresher is considerably increased by the transmission described permitting the driver during the travel of the harvester to vary the speed of the threshing drum to suit any particular requirement existing at the time. Thus, it may happen during harvesting operation in one and the same field that the speed of operation of the threshing drum must be changed to suit the requirements. Where the grain straw is moist for instance, a higher speed of operation should be used without risking breakage of the kernels, whereas the threshing of dry grain straw requires a reduced threshing speed in order to prevent excessive breakage of the kernels. Thus, by simple manipulation of lever 72 the driver of the harvester thresher may easily adjust the speed of the threshing drum without stopping the harvester for such purpose. Also, the speed of operation of the threshing drum may be readily changed depending on the nature of the material to be threshed. In this manner, the straw will be better preserved.

As numerous harvester threshers now in operation are already equipped with a motor-driven pump, such as pump 27, to produce pressure fluid for the actuation of various mechanisms, such as for lifting and lowering the header platform 13 or other purposes, my invention may be easily applied to existing harvester threshers and requires but comparatively inexpensive additional equipment. Owing to the automatic maintenance of the proper tension in the V-belt 36, the wear thereof is limited to a minimum.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. For use in a threshing machine having a pump; a drive comprising a driving shaft, a driven shaft, and driving means connected with said shafts, said driving means comprising variable pitch pulleys on said shafts each composed of at least one pair of disks, each having a conical face, means for mounting said disks with said faces in opposed relationship for common rotation and relative axial displacement, a pair of fluid-operable units each coordinated to one of said pulleys and composed of a cylinder element and of a piston element, means in each pulley including anti-friction bearings for connecting one of said elements in non-rotating condition with one of said disks and for connecting the other one of said elements in non-rotating condition with the other one of said disks, and settable valve means common to both of said fluid-operable units for simultaneously admitting a fluid under pressure from said pump to one of said units and discharging fluid from the other one of said units, and vice versa.

2. For use in a threshing machine having a pump, a drive comprising a driving shaft, another shaft, and a variable V-belt transmission connected to said shafts, said transmission comprising variable pitch pulleys mounted on said shafts, each pulley being composed of at least one pair of disks, each disk having a conical face, and means for mounting said disks with said faces in opposed relationship for common rotation and relative displacement, a fluid-operable actuating unit connected with at least one of said pulleys and comprising a cylinder element and a piston element, means in said one pulley including anti-friction bearings for connecting one of said elements in non-rotating condition with one of said disks and for connecting the other one of said elements in non-rotating condition with the other one of said disks, and a manually adjustable valve for controlling the admission and discharge of a fluid from said pump to and from said unit.

References Cited in the file of this patent

UNITED STATES PATENTS

| | | |
|---|---|---|
| 1,035,860 | Conradson | Aug. 20, 1912 |
| 1,496,882 | Ingersoll | June 10, 1924 |
| 2,198,940 | Heyer et al. | Apr. 30, 1940 |
| 2,302,483 | Welty | Nov. 17, 1942 |
| 2,521,457 | Heyer | Sept. 5, 1950 |
| 2,611,227 | Keller | Sept. 23, 1952 |
| 2,639,569 | Pasturczak | May 26, 1953 |

FOREIGN PATENTS

| | | |
|---|---|---|
| 577,636 | Great Britain | May 27, 1946 |